June 16, 1964 E. H. CABANISS 3,137,463
BREAKAWAY CIRCUIT FOR RADAR TRACKING, AUTOPILOT
OPERATED AIRCRAFT
Filed May 4, 1962
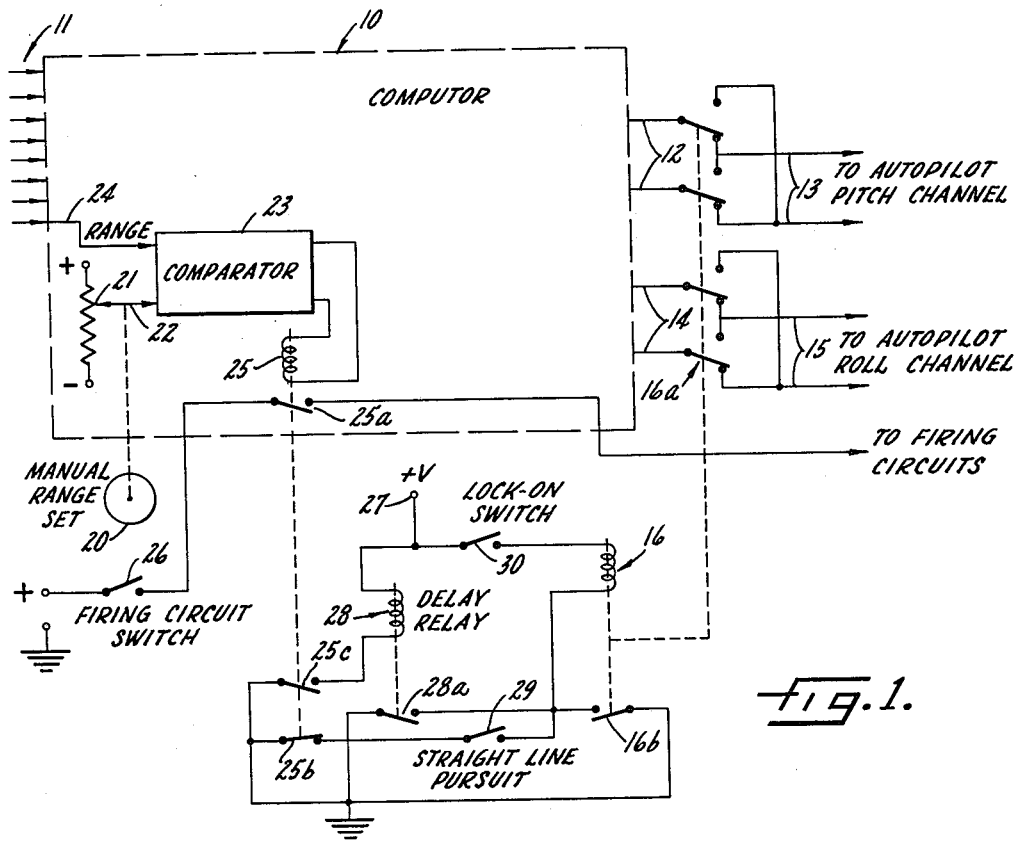
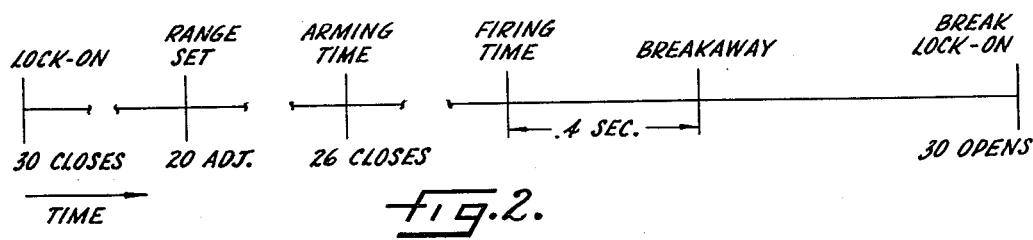
INVENTOR.
Edward H. Cabaniss
BY
H. H. Losche
Attorneys.

United States Patent Office 3,137,463
Patented June 16, 1964

3,137,463
BREAKAWAY CIRCUIT FOR RADAR TRACKING, AUTOPILOT OPERATED AIRCRAFT
Edward H. Cabaniss, Schenectady, N.Y., assignor, by mesne assignments, to the United States of America as represented by the Secretary of the Navy
Filed May 4, 1962, Ser. No. 192,613
11 Claims. (Cl. 244—77)

This invention relates to aircraft control circuits and more particularly to a "breakaway" circuit for use in conjunction with an automatically piloted interceptor aircraft that is directed toward a target in a target tracking mode by radar target information computed into aircraft attitude error signals, which signals are reversed by the "breakaway" circuit at a preset range to divert the interceptor from the target tracking mode or collision course to the target.

Fighter and interceptor aircraft have been developed under national defense to the degree of technology where high speed aircraft are automatically directed in attitude to track a target and at optimum times to fire selected destructive missiles or ammunition, generally referred to as weapons, at the target. The present day speed requirements for war time measures rule out manual control and operation of fighter and interceptor aircraft for the most effective means of target destruction whether these targets be enemy aircraft, warships, tanks, or land, sea, or air gun placements of missile launching positions. Manual operation and control of such aircraft have given way to the most effective means of seeking out targets by radar and the radar information has been used in electronic computers, or the like, to compute signals adaptable for the automatic pilot of the aircraft to cause target tracking by the aircraft and destruction of the target. While good practical systems have been devised for target detection and automatic target tracking and destruction, the aircraft pilot must still use judgment in selecting the mode of attack, the type of destructive weapons to use, and the means of evasive action to take after the destructive weapons have been spent. The last of the above three judgments, which has not been provided automation to the point of precise reliability, is one requiring such quick and accurate routine judgment that good automation would be very desirable. A fighter or interceptor aircraft, by virtue of its manpower limitations to usually one man, the pilot, has guns or rocket launchers fixed thereon to fire forward parallel to the longitudinal centerline of the aircraft. The automatically controlled aircraft, hereinafter referred to as an interceptor, tracking a target to maintain the interceptor on a line of sight to the target, also automatically expends, or at least signals the pilot to expend, the destructive weapons at the proper time for effective destruction of the target. It is also to be remembered that this automatic tracking course is also a collision course, and it is usually up to the pilot, after expenditure of the weapons at the target—usually at close range where the fire power is most effective—to take over the control of the interceptor for evasive action to avoid collision with the target, or to avoid damage from the explosion or destruction of the target by virtue of the close proximity of the interceptor. The hiatus or void in the presently known autopiloted interceptor system to track the interceptor to a target is the means to cause the interceptor to "breakaway" automatically from the tracking or collision course as soon after the weapons are spent as possible. The time interval following the expenditure of the weapons at the target and the time to take evasive action to avoid collision with the target becomes very short for the high speed aircraft of today—and particularly when rocket ammunition is used and rocket firing and igition time must be taken into account. This time interval is becoming so short that the agility of the best physical specimen of aeronaut is challenged. The needed automation is not for the complete evasive action, for this requires the cunning and skill of the intellect which man must supply, but the needed automation is for that earliest precise instant following the expenditure of the weapons to cause the interceptor to breakaway, after which breakaway the pilot can assume full control of the interceptor for the evasive action required under the circumstances. It is this hiatus or void in the automatic system which this invention fills in to ease the most apprehensive moments for the interceptor pilot.

The present invention is used in interceptor aircraft with an armament control system having a search-track radar, a computing means for accepting the radar information and making computations in analog voltages to develop error signals of the interceptor altitude, and an autopilot for accepting those error signals to automatically control the interceptor in a direction toward the target. The interceptor is ordinarily manually controlled in attitude by the pilot while the radar is in its search mode and, as soon as a target or targets are illuminated by the interceptor radar, the pilot manually selects the target that he wishes to engage and manually adjusts a range control at which range he wishes the weapons, such as bullets or rockets, to be discharged against the target. The preset range is compared with the actual range coming from the radar at which time the pilot is signaled, or circuits are established automatically, to expend the weapons for destruction of the target. Where the firing circuits are automatically established by the signal from the range comparator, the pilot should close any firing circuit safety switches preparatory for the firing circuit to be energized automatically. In like manner, once the pilot has selected the range and the weapons to be used in the pursuit of the target, the system should be set for lock-on at which time the radar information is computed in the computer circuit to produce output error signals to the autopilot of the interceptor to cause the interceptor to be automatically guided toward the target as is well understood by those skilled in the armament control system art. At the same time that the comparator produces a signal, or closes the firing circuits in the case of automatic firing, a relay circuit means is actuated to establish a circuit through a delay relay which in turn actuates a relay to throw reversing switches in the pitch and roll channels to the automatic pilot from the computing means to cause the interceptor to breakaway from its target tracking or collision course at a precise interval after the firing circuits have been closed and the weapons spent. The breakaway of the interceptor from its target tracking course will cause the radar circuits to break lock-on, which lock-on circuits could likewise be used to automatically disconnect the breakaway circuit thereby turning the control of the interceptor back to the pilot for such evasive maneuvers as may be desirable or expedient in avoiding collision with his own target or other obstructions which may be encountered. In this manner high speed interceptor aircraft can be automatically diverted at the earliest possible instant after discharge of its weapons to avoid disastrous results of colliding with its own target. It is therefore a general object of this invention to provide a breakaway circuit to be used in conjunction with an interceptor aircraft automatically piloted toward a selected target from radar information produced by that target causing the interceptor to automatically break away from its target tracking and collision course an instant following the expenditure of target destructive weapons to avoid collision or other disastrous results of the interceptor.

These and other objects and the attendant advantages and uses will become more apparent to those skilled in the art of interceptor autopiloted operations when considered along with the accompanying drawing, in which:

FIGURE 1 is a partially block and partially schematic circuit diagram of the breakaway circuit incorporated in the computer-autopilot circuitry of an automatically piloted, radar directed interceptor, and FIGURE 2 is a time graph showing the respective times of occurrence of various operations of interceptor control.

Referring more particularly to FIGURE 1, a computing means is illustrated in the broken block 10 and shown as receiving electrical intelligence information from a radar and other sources (not shown) in the interceptor by the inputs 11 thereto to produce error voltage signals on the outputs 12 to the autopilot pitch control channel 13 and on the output 14 to the autopilot roll control channel 15. In the pitch control channels 12, 13 is a reversing switch of the double pole-double throw type, and in like manner in the roll control channel 14, 15 is a reversing switch of the double pole-double throw type. These switches, being ganged as illustrated by the broken line actuator and identified in their entirety by the reference character 16a, simultaneously reverse the circuits in the two channels upon the actuation of the switches 16a. The reversing switches 16a are actuated by a reversing relay switch 16 in the breakaway circuit soon to be described.

A manual range set 20 in the pilot's compartment is operative to adjust a potentiometer 21 or other means for establishing a voltage representative of the range at which the pilot desires the weapons of his interceptor to be spent with respect to the target fired upon. This preset range voltage is applied by way of the conductor means 22 as one input to a comparator circuit 23 which also receives as a second input of the range voltage over conductor means 24 developed from the radar circuits (not shown). The comparator 23 will energize a firing circuit relay 25 when the actual range voltage representative of the actual range of the interceptor from the target reaches the preset range voltage set in by the pilot on the adjustment means 20. The comparator 23 and relay 25 may be incorporated within the computer means 10 or may be outside the computer means 10, whichever is desirable in the production design of such systems. The computer means 10 may be of any known system of computing radar and other necessary information to produce error voltage signals adaptable for autopilot use, such computer systems being shown and described in the U.S. Patent 2,704,490 to E. B. Hammond, Jr., for "Fire Control System for Aircraft Guns" or the Patent 2,737,652 to G. E. White et al., for "Fixed Gun Inter-Aircraft Fire Control System." In incorporating the breakaway circuit in such a radar, computer, autopilot system it is only necessary that the radar range information be available and that the autopilot pitch and roll channels be cut to insert the reversing switches 16a.

The relay switch 25 has normally open single pole-single throw switch contacts 25a in a firing circuit, also having the safety switch 26 therein to be operated by the pilot at the proper time. The relay switch 25 likewise has normally closed single pole-single throw switch contacts 25b and normally open single pole-single throw switch contacts 25c actuatable thereby. The relay switch contacts 25c are in circuit from a voltage source introduced at 27 through a relay coil of a delay relay switch 28 to ground, or the opposite pole of the supply voltage 27. The switch contacts 25b are in series from ground, or the opposite pole of the voltage 27, through a single pole-single throw switch 29, the relay coil of relay switch 16, and the switch contacts of a single pole-single throw lock-on switch 30 to the voltage source 27. The delay relay switch 28 actuates normally open single pole-single throw switch contacts 28a establishing a parallel circuit to ground through the relay coil of relay switch 16. The relay coil of relay switch 16 also actuates normally open single pole-single throw switch contacts 16b establishing another parallel circuit through the relay coil of relay switch 16 which latter circuit is a holding circuit for the relay switch 16. The circuit just described constitutes the breakaway circuit which will be operative in the autopilot pitch and roll channels to break the interceptor away from its tracking and collision course with the target a very short instant of time after the expenditure of weapons. The delay relay switch 28 is of the delay closing type, many of which are well known and catalogued by several commercial companies. This breakaway circuit may be bodily included in the computer 10 or made separate from the computer 10 as production design dictates so long as the computer range information is available to the breakaway circuit.

*Operation*

In the operation of this invention let it be assumed that an interceptor is used bearing an autopilot, a search-track radar, and a computer for computing radar signal information into pitch error voltage and roll error voltage for application to the autopilot whenever the pilot of the interceptor switches the system for automatic piloting. Whenever the radar engages one or more targets, the pilot selects the target which he intends to engage and establishes "radar lock-on" so that the automatic pilot is now driven to direct the aircraft with fixed guns or rocket launchers toward the target to be engaged. When the lock-on is established to cause tracking by the interceptor, the lock-on switch 30 of the breakaway circuit may likewise be automatically closed by the lock-on circuitry, or manually closed by the pilot, to prepare the breakaway circuit for operation as shown in the time graph in FIGURE 2. The pilot determines the type of weapons to be used such as guns or rockets and manually adjusts the manual range set 20 accordingly. When the interceptor pilot is certain that the target is an enemy, he presets the firing circuits for operation by closing the safety switch 26 as shown in the time graph, FIGURE 2. As the interceptor approaches the target, the comparator 23 will become operative at the time that the actual range of the interceptor compares in voltage amplitude with the voltage range set by the potentiometer 21 at which time the firing relay 25 will be energized to close the firing circuit through the switch contacts 25a to dispose of the selected weapons. Simultaneously with the closing of the firing circuit contacts 25a, the switch contacts 25b will be opened and the switch contacts 25c will be closed to establish a circuit through the delay relay switch 28. This firing time is illustrated in FIGURE 2 at which time the delay relay is initially energized and with a delay of approximately .4 second the delay relay contacts 28a will be closed as shown in the graph in FIGURE 2 to produce breakaway. The closing of the delay relay contacts 28a establishes a circuit through the relay coil of relay switch 16 to close the holding circuit through the contact 16b and to reverse the pitch and roll error voltage signals to the autopilot by switching the double pole-double throw contact switches 16a in each of the pitch and roll channels. This immediately causes the error voltages to increase in both the pitch and roll channels which, through the automatic pilot control, will instantaneously divert the interceptor from its path, thereafter breaking radar lock-on at which time switch 30 will be opened whereupon the several relays will again assume their positions as shown in FIGURE 1. The pilot of the interceptor will again assume command of the aircraft to make evasive maneuvers as required by disengaging the autopilot circuit or over-riding the controls, depending on the type of autopilot used. Where the lock-on switch 30 is manually controlled, the pilot of the interceptor can disconnect this breakaway circuit by opening switch 30 at the same time that he reassumes control of the aircraft. Switch 29 may be used for testing the reversing relay switch 16 or under conditions where the pilot wishes to manually control the breakaway time in the actual engagement of a target as by evasive maneuvers before the weapons are spent. The incorporation of the breakaway circuit into the automatic pilot of a radar controlled interceptor aircraft to cause breakaway the very instant that precision breakaway is needed after the expenditure of weapons, is acquired by this circuit which relieves the pilot of the additional duty of breakaway maneuver during very strenuous moments when his activity is at its peak. Such a breakaway circuit also greatly contributes to the safety of the interceptor and the pilot in the pursuit of targets.

While many modifications and changes may be made in the constructional details and features of this invention in the incorporation thereof in the various known systems of radar controlled, automatically piloted interceptor aircraft without departing from the spirit and scope of this invention, it is to be understood that I desire to be limited in my invention only to the extent of the appended claims.

I claim:

1. A breakaway circuit for producing breakaway signals of an interceptor aircraft automatically pilot-controlled toward a target comprising:
   autopilot control channels conducting control signals from computer computed radar information including range signal information;
   a comparator;
   means applying said radar range signal information and a manually set range signal to said comparator to produce a comparator output signal whenever said radar range signal compares equally with said manually set range signal;
   delaying means coupled to said comparator for delaying said comparator output signal; and
   reversing means coupled to reverse said control signals in said control channels upon signal actuation and coupled to said delaying means to actuate said reversing means upon receiving a delayed comparator output signal whereby said autopilot control channel signals are reversed for breakaway tactics when the actual range reaches a preselected range.

2. A breakaway circuit as set forth in claim 1 wherein said control channels are electrical circuits and said reversing means is an electromagnetically actuated relay reversing switch.

3. A breakaway circuit as set forth in claim 2 wherein said computed radar information is error signal information adapted to be reduced in amplitude proportionately with decrease in interceptor-to-target alignment.

4. A breakaway circuit for producing breakaway signals of an interceptor aircraft automatically piloted toward a target comprising:
   an autopiloted interceptor aircraft radar directed toward a target by autopilot signals;
   a comparator carried by said interceptor;
   means applying radar range and a manual range set to said comparator to produce on an output of said comparator a signal when the radar range compares equally with said manual range set;
   means coupled to said comparator for delaying said comparator output signal; and
   a reverse switching means in said autopiloted interceptor aircraft associated wth the delayed output of said comparator to reverse said autopilot signals to the aircraft at the preselected manual range set to break said interceptor away from its autopiloted path toward the target.

5. A breakaway circuit for producing breakaway signals of an interceptor aircraft automatically piloted toward a target comprising:
   an interceptor aircraft adapted to be automatically pilot-controlled to a target by computed signals from a radar that are computed to produce pilot-control signals by a radar computer carried by said interceptor;
   a comparator carried by said interceptor;
   means applying radar range signals and a manually set range signal to said comparator to produce on an output of said comparator a signal when the radar range signals compare equally with said manually set range signal;
   means coupled to said comparator for delaying the comparator output signals;
   switching means coupled in said interceptor automatic pilot control adapted, upon actuation thereof, to reverse said computer pilot-control signals; and
   means coupled to receive said delayed signals from said delaying means and to actuate said switching means upon the application of a delayed signal thereto to reverse the computer pilot-control signals to said automatic pilot of said interceptor to cause said interceptor to depart from its direction toward a target a predetermined interval of time after the accomplishment of comparison of said radar range signals with said manually set range signal.

6. A breakaway circuit as set forth in claim 5 wherein said computed pilot-control signals used for controlling the interceptor automatically toward a target are error signals which are adapted to be reduced to zero as the interceptor is controlled to an on-target course, and said delayed comparator output signals reverse said error signals to control said interceptor away from said on-target course by said means to actuate said switching means.

7. A breakaway circuit as set forth in claim 6 wherein said switching means and said means to actuate said switching means is an electromagnetic relay reversing switch.

8. A breakaway circuit for producing breakaway signals to effect breakaway of an interceptor aircraft automatically pilot-controlled in radar tracking mode to a target comprising:
   an interceptor aircraft carrying a radar and a computing means for computing radar information of a target into interceptor attitude error signals coupled in circuit through pitch and roll channels to control the direction of the interceptor toward the target to reduce said error signals to zero;
   a comparator carried by said interceptor, said comparator coupled to receive range voltage information from said radar and a manually preset range voltage to develop a voltage output therefrom upon the equal amplitude voltage comparison of said range voltage information with said preset range voltage;
   a delay-type electrical relay switching means coupled to said comparator output to activate same upon energization thereof; and
   reversing switches in said pitch and roll channel circuits operatively associated with said delay-type electrical relay switching means to reverse said error signals after the occurrences of delayed switching of said output voltage from said comparator to produce an increase in said error signals and thus cause the interceptor to deviate from its direction toward the target.

9. A breakaway circuit as set forth in claim 8 wherein said delay-type electrical relay switching means includes a delay relay switch having its switch contacts coupled to a voltage source through an energization means of said reversing switches whereby there is a delay in the activation of said reversing switches for a predetermined period of time after the occurrence of output voltage from said comparator.

10. A breakaway circuit as set forth in claim 9 wherein said reversing switches includes a single pole-single throw switch in a circuit paralleling the energization means of said reversing switches to establish a holding circuit for said reversing switches whereby breakaway of said interceptor will continue after comparison of said radar range voltage information and said preset range voltage ceases.

11. A breakaway circuit for producing breakaway signals to effect breakaway of an interceptor aircraft automatically pilot-controlled in radar tracking mode to a target comprising:

an interceptor aircraft carrying a radar and a computing means for computing radar information of a target into interceptor pitch and roll error signals coupled in circuit through autopilot pitch and roll channels to control the tracking direction of the interceptor toward the target to reduce said error pitch and roll signals to zero;

a comparator circuit carried by said interceptor, said comparator circuit being coupled to receive range voltage of an amplitude representative of range from the interceptor to the target and to receive a preset voltage of an amplitude corresponding to a range at which weapon expenditure and breakaway is desired to produce an output voltage on an output thereof when the range voltage amplitude compares equally with the amplitude of said preset voltage;

a firing relay switch coupled to be energized by said comparator circuit output, said firing relay switch having switch contacts to close, upon energization, a firing circuit to expend weapons, and said firing relay switch also having an alternately seated normally open and normally closed pair of switch contacts;

a delay relay switch having normally open switch contacts and having its energizable actuator in circuit to a voltage source through said firing relay switch normally open switch contacts;

a reversing relay switch having reversing switches in said pitch and roll channel circuits, having its energizable actuator in circuit to a voltage source through said normally open switch contacts of said delay relay switch, and having normally open switch contacts in parallel with said voltage source and the energizable actuator thereof to provide a holding circuit therefor; and two switches being in the circuit of the energizable actuator of said reversing relay switch, one of said two switches adapted to be actuated closed upon the occurrence of the interceptor being locked onto the target in tracking mode, and the other of said two switches being in series with said normally closed firing relay switch adapted to be closed for allowing the breakaway circuit to operate manually and adapted to be opened for disabling the manual operation of the breakaway circuit whereby the interceptor will have the pitch and roll error signals reversed a predetermined time interval after said firing relay switch is closed to cause said interceptor to breakaway from the target tracking mode thereby opening said one of said two switches to return said interceptor to manual pilot control.

References Cited in the file of this patent

UNITED STATES PATENTS

| | | |
|---|---|---|
| 2,499,349 | Ayres | Mar. 7, 1950 |
| 2,901,744 | Isely | Aug. 25, 1959 |
| 2,992,423 | Floyd | July 11, 1961 |
| 3,005,194 | Goodell | Oct. 17, 1961 |